(12) United States Patent
Nicholson

(10) Patent No.: US 7,171,238 B2
(45) Date of Patent: Jan. 30, 2007

(54) SELF-IDENTIFYING ANTENNA SYSTEM

(75) Inventor: James C. Nicholson, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 10/757,134

(22) Filed: Jan. 14, 2004

(65) Prior Publication Data

US 2005/0153665 A1 Jul. 14, 2005

(51) Int. Cl.
*H04B 1/00* (2006.01)
(52) U.S. Cl. ............... 455/557; 333/17.1; 333/17.2; 333/17.3; 455/552.1
(58) Field of Classification Search ........... 455/129, 455/107, 115.1, 426.2, 41.2, 550.1, 552.1, 455/554.2; 333/17.1–17.3, 24 R, 32; 324/549, 324/612; 343/894
See application file for complete search history.

(56) References Cited

U.S. PATENT DOCUMENTS

| | | | |
|---|---|---|---|
| 5,491,715 A * | 2/1996 | Flaxl ........................... 375/344 |
| 5,745,844 A * | 4/1998 | Kromer et al. ........... 455/193.1 |
| 6,236,841 B1 * | 5/2001 | Akiya ......................... 455/91 |
| 6,687,488 B2 * | 2/2004 | Elder et al. ................. 455/118 |
| 6,687,492 B1 * | 2/2004 | Sugar et al. .............. 455/276.1 |
| 6,788,731 B2 * | 9/2004 | Kim et al. ................... 375/142 |
| 6,823,180 B2 * | 11/2004 | Reed et al. .................. 455/305 |
| 6,853,197 B1 * | 2/2005 | McFarland et al. .......... 324/549 |
| 6,862,433 B2 * | 3/2005 | Callaway, Jr. .............. 455/101 |
| 6,873,651 B2 * | 3/2005 | Tesfai et al. ................. 375/219 |
| 2004/0127247 A1 * | 7/2004 | Reece et al. ............. 455/550.1 |

* cited by examiner

*Primary Examiner*—Quochien B. Vuong
*Assistant Examiner*—Christian A. Hannon
(74) *Attorney, Agent, or Firm*—Tucker, Ellis, & West LLP

(57) ABSTRACT

An antenna system is disclosed, to be used with a radio component particularly a wireless access point or bridge. The present system includes an antenna element for transmitting and receiving signals at radio frequencies. An antenna connector is provided for establishing a signal connection between the antenna element and a radio component. An electronic serialization component is provided for indicating one or more predetermined antenna characteristics. This component is adapted to read out the predetermined antenna characteristics through the antenna connector to the radio component.

33 Claims, 1 Drawing Sheet

SELF-IDENTIFYING ANTENNA SYSTEM

BACKGROUND OF THE INVENTION

The present system is directed to the field of antenna technology for wireless communication. The present system has special applicability in a wireless access point (AP) or wireless bridge (BR) of the type used with a wireless local area network (WLAN.)

The Federal Communications Commission (FCC) and other regulatory agencies worldwide place a number of restrictions on intentional radiator components such as transmitting radio antennas. In one instance, the FCC requires that radio components for WLAN devices operate at a fixed maximum power level, so as to maintain compliance with an approved antenna gain. This power level is established for each WLAN device during the installation of a WLAN. In order to insure compliance with the power/gain requirements, the FCC requires that a professional, licensed installer be contracted to install these components, and that once installed the end user has no access to increase the maximum available power level set by the professional installer.

In a further effort to insure compliance, the FCC requires that intentional radiators such as WLAN devices be designed so that no antenna may be used with the device other than the one specifically provided. Most manufactures accomplish this by providing a non-standard, proprietary reverse-TNC connector, for joining the radio component to the antenna. This special connector adds expense to the AP, while providing no additional functionality or other benefit beyond compliance with regulations.

SUMMARY OF THE INVENTION

The difficulties and drawbacks of previous-type systems are overcome by the present antenna system, to be used with a radio component particularly a WLAN device. The present system includes an antenna element for transmitting and receiving signals at radio frequencies. An antenna connector is provided for establishing a signal connection between the antenna element and a radio component. An electronic serialization component is provided for indicating one or more predetermined antenna characteristics. This component is adapted to read out the predetermined antenna characteristics through the antenna connector to the radio component.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE EMBODIMENTS

Figure 1:
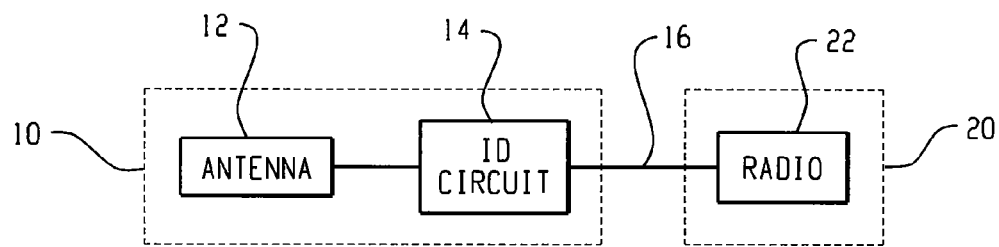
FIG. 1 is a block diagram representing the structure of a preferred embodiment in accordance with the present system.

As shown in FIG. 1, an antenna system 10 is disclosed that cooperates with a wireless transceiver 20, preferably for exchanging wireless telecommunications in the radio frequency (RF) band of the electromagnetic spectrum. The antenna system 10 includes an antenna element 12 for transmitting and receiving signals at radio frequencies. In the preferred embodiment, the present antenna system 10 is used in accordance with a wireless access point or bridge of the type used with a WLAN. In such an embodiment, it is contemplated that the present system would communicate over one or both of the 2.4 GHz and 5 GHz wireless bands, in accordance with the IEEE 802.11 protocols. Of course, it should be appreciated that the present embodiments could be used with any wireless communication device, operating under any wireless band, including large communications stations and small, hand-held units, all without departing from the scope of the invention.

The present antenna element 12 cooperates with an electronic serialization component 14 for indicating one or more predetermined antenna characteristics. The electronic serialization component 14 can be any suitable type of identification circuit, where the predetermined antenna characteristics are coded into or by the circuit. The predetermined antenna characteristics can be any suitable type of information that can be used to identify the antenna or its properties. For example, the characteristics can include the level of antenna gain and its associated maximum output power, desired operation of the antenna, including selecting a preferred operational frequency band. The characterizing can also include a product model identification number, including the manufacturer and the specific radio components and type of connection with which the antenna 12 is permitted to operate, in accordance with worldwide regulatory requirements. Any other suitable identification characteristics could also be employed, without departing from the invention.

In the preferred embodiment, the electronic serialization component 14 is a programmable circuit, such a semiconductor memory chip. In the preferred embodiment, a Dallas Semiconductor DS2502P memory chip could be used, though any other suitable component(s) could be used. However, a hard-coded circuit may also be used, such as an analog or digital threshold detection circuit for detecting a desired voltage threshold, corresponding to a predetermined limit of antenna gain. Any other suitable circuit can be provided for detecting any other physical property of the signal, such as current, frequency, waveform, and any other suitable characteristic that might be detected. It should also be appreciated that the antenna system can include any number of antenna elements in an antenna array, to establish any desired radiation pattern or any sort of sectorized communications service area, such as is known in the art.

In the preferred embodiment, the serialization component 14 is an integral part of an antenna system that can be connected to the wireless transceiver 20, so as to provide an externally-mounted antenna system 10. The antenna system 10 can also be internally-mounted into a transceiver housing, so as to be a part of an internal unit. In any event, an antenna connector 16 is used for establishing a signal connection between the antenna element 12 and a radio component 22 within the transceiver 20. The serialization component 14 is mounted "downstream" of the antenna element 12. The antenna connector 16 can be a coaxial cable, or any other suitable means for establishing a signal connection with the radio component 22.

Figure 2:
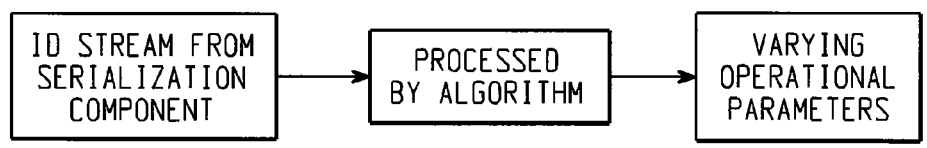
FIG. 2 is a flow chart illustrating the method of varying operational parameters in accordance with the present system.

In operation, as shown in FIG. 2 the serialization component 14 is configured to "read out" the programmed antenna characteristics, so as to send an "identification stream" through the antenna connector 16 to the radio component 22. The radio component 22 includes an algorithm and suitable hardware for receiving and processing the signal from the serialization component 14, so as to vary one or more operational parameters in response to antenna characteristics. For example, if a required antenna gain is indicated the radio component algorithm automatically sets a limit on maximum power as indicated by the antenna element 12, so as to maintain compliance with the FCC-mandated antenna gain. In this way, a WLAN can now be installed without a lot of "fine-tuning" of maximum output power by professional installers. By enabling antenna gain to be automatically detected by the algorithm, the present system could feasibly be installed by average maintenance personnel. It is hoped that the present invention would simply rollout of a WLAN, and possibly lead to the revision of the FCC installation requirements.

The present algorithm can be adapted to read out frequency specifications from the serialization component 14. For example, in certain types of high-gain antennas, it is required that the end channels of the band not be used, to avoid interference encroachment at the adjoining bands. By specifying which channels cannot be used, the present serialization component 14 can instruct the radio component 22 to not transmit signals over prohibited frequency channels. In this way, the present system can enable a single antenna system to replace a number of different antenna systems currently manufactured and marketed. For example, in 5 GHz antenna systems, integral antenna systems are known that work in all bands, including the unlicensed UNII-1 band, which has a 200 mW operational limit. External antenna systems are known that work in all bands other than UNII-1. These antennas are otherwise similar, but two products are sold for each respective applications with the present systems, it is contemplated that a single antenna product "part number" can be manufactured, with the requirements for external and internal antennas programmed into the serialization component 14. In this way, the present system can reduce manufacturing, packaging, inventory and distribution thereby realizing a considerable improvement in efficiency.

The present system also has the potential to alleviate the requirement that proprietary antennas be used with proprietary transceiver components. Rather than use a unique type of electrical connector between the antenna and the radio component, the present radio component can be programmed to not function unless the correct product model number is read out of the serialization component 14. Similarly, the circuit of the serialization component 14 can include a switch, physical or programmatic, which disables the radio unless it identifies the correct type of antenna component 12. In this way, compliance with regulatory standards is obtained without incurring the additional expense of manufacturing a proprietary antenna connector component.

In addition to facilitating FCC compliance, the present system allows for network management functionality. Since the antennas can "talk" to the access point or bridge, their predetermined antenna characteristics can also be read by a network administrator in a remote location. This can assist in inventory control and technical support of the WLAN, since all the antennas in a WLAN can be read out. In this way, compliance can be assured at the administrative level, and any failures or other operational variations can be detected. The present system also offers the flexibility of reprogramming one or more serialization components via the network. In a system upgrade, new access points can be added to a WLAN, e.g. for distributing sectorized coverage of a conference room over a number of newly added wireless channels. In this event, it may be desirable to remotely reprogram the serialization component "on the fly" over the network, to select a new maximum output power and/or channel limitation. In this way, the present system also allows greater control and flexibility of network management.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. An antenna system comprising:
    an antenna element for transmitting and receiving signals at radio frequencies;
    an antenna connector for establishing a signal connection between the antenna element and a radio component; and
    an electronic serialization component for indicating at least one predetermined antenna characteristic, and adapted to read out the at least one predetermined antenna characteristic through the antenna connector to the radio component is coupled between the antenna element and the antenna connector;
    wherein the electronic serialization component comprises a circuit, the at least one predetermined antenna characteristic is coded into the circuit;
    wherein the circuit comprises a threshold detection circuit for detecting a predetermined voltage threshold, corresponding to a predetermined antenna gain; and
    wherein the electronic serialization component is reprogrammable to allow a change of a value of the at least one predetermined antenna characteristic.

2. The antenna system of claim 1, wherein the at least one predetermined antenna characteristic is selected from a group consisting of operational frequency band, product model number and type of connection.

3. The antenna system of claim 2, wherein the circuit comprises a semiconductor memory chip.

4. The antenna system of claim 2, wherein the antenna element comprises a plurality of antenna elements in an antenna array.

5. A wireless communication device comprising:
    a radio component for exchanging wired electronic signals with wireless signals;
    an antenna system comprising:
    an antenna element for respectively transmitting and receiving at radio frequencies the wireless signals exchanged with the radio component;
    an antenna connector for establishing a signal connection between the antenna and the radio component; and
    an electronic serialization component for indicating predetermined antenna characteristics, and adapted to read out the predetermined antenna characteristics through the antenna connector to the radio component;
    wherein the electronic serialization component is coupled between the antenna connector and the antenna element and is responsive to a remote signal to change a value of a selected predetermined antenna characteristic; and wherein the electronic serialization component comprises a circuit, wherein the predetermined antenna characteristics are coded into the circuit, the circuit comprises a threshold detection circuit for detecting a predetermined voltage threshold, corresponding to a predetermined antenna gain.

6. The wireless communication device of claim 5, wherein the predetermined antenna characteristics include one of a group consisting of operational frequency band, product model number, maximum output power and type of connection.

7. The wireless communication device of claim 5, wherein the circuit comprises a semiconductor memory chip.

8. The wireless communication device of claim 5, wherein the antenna element comprises a plurality of antenna elements in an antenna array.

9. The wireless communications device of claim 5, wherein the antenna system is an integrally mounted antenna system.

10. The wireless communications device of claim 5, wherein the antenna system is an externally mounted antenna system.

11. The wireless communications device of claim 5, wherein the radio component comprises at least one algorithm for varying at least one operational parameter in response to the predetermined antenna characteristics.

12. The wireless communications device of claim 11, wherein the predetermined antenna characteristics comprise antenna gain, and wherein the radio component algorithm sets antenna power so as to maintain antenna gain.

13. The wireless communications device of claim 5, wherein the radio component and antenna system are included in at least one of a wireless access point and bridge for use with wireless local area network.

14. A method of antenna operation comprising:
receiving an identification stream from an antenna serialization component;
processing the identification stream so as to identify at least one predetermined antenna characteristics;
varying at least one operational parameters of a radio component in response to the at least one predetermined antenna characteristic; and
modifying a value of the at least one antenna characteristic of the identification stream stored at the antenna serialization component responsive to a remote signal;
wherein the at least one predetermined antenna characteristic comprises a predetermined radio component operational frequency range.

15. The method of claim 14, wherein the steps of processing and varying are implemented by an algorithm within the radio component.

16. The method of claim 14, wherein the at least one predetermined antenna characteristic comprises a predetermined antenna component number, and wherein the at least one operational parameter respectively comprises a command to disable the radio component if the predetermined antenna component number is not indicated.

17. The method of claim 14, further comprising a step of reading predetermined antenna characteristics over a network by a network administrator in a remote location.

18. A method of antenna operation comprising:
receiving an identification stream from an antenna serialization component;
processing the identification stream so as to identify at least one predetermined antenna characteristics;
varying at least one operational parameters of a radio component in response to the at least one predetermined antenna characteristic;
modifying a value of the at least one antenna characteristic of the identification stream stored at the antenna serialization component responsive to a remote signal; and
reading predetermined antenna characteristics over a network by a network administrator at a remote location.

19. The method of claim 18, wherein the steps of processing and varying are implemented by an algorithm within the radio component.

20. The method of claim 18, wherein the steps of processing and varying are implemented by an algorithm within the radio component.

21. The method of claim 18, wherein the at least one predetermined antenna characteristic comprises a predetermined radio component operational frequency range.

22. The method of claim 18 wherein the at least one predetermined antenna characteristic comprises a predetermined antenna component number, and wherein the at least one operational parameter respectively comprises a command to disable the radio component if the predetermined antenna component number is not indicated.

23. An antenna system comprising:
an antenna element for transmitting and receiving signals at radio frequencies;
an antenna connector for establishing a signal connection between the antenna element and a radio component; and
an electronic serialization component for indicating at least one predetermined antenna characteristic, and adapted to read out the predetermined antenna characteristics through the antenna connector to the radio component is coupled between the antenna element and the antenna connector;
wherein the electronic serialization component is reprogrammable to allow a change of a value of the at least one predetermined antenna characteristic; and
wherein the at least one predetermined antenna characteristic comprises a predetermined radio component operational frequency range.

24. The antenna system of claim 23 wherein the predetermined antenna characteristics comprises one of a group consisting of: antenna gain, product model number and type of connection.

25. The antenna system of claim 24, wherein the circuit comprises a semiconductor memory chip.

26. The antenna system of claim 25, wherein the circuit comprises a threshold detection circuit for detecting a predetermined voltage threshold, corresponding to a predetermined antenna gain.

27. An antenna system, comprising:
means for receiving an identification stream from an antenna serialization component;
means for processing the identification stream so as to identify at least one predetermined antenna characteristics;
means for varying at least one operational parameters of a radio component in response to the at least one predetermined antenna characteristic; and
means for modifying a value of the at least one antenna characteristic of the identification stream stored at the antenna serialization component responsive to a remote signal;

wherein the at least one predetermined antenna characteristic comprises a predetermined radio component operational frequency range.

28. The system of claim 27, wherein the means for processing and means for varying are implemented within the radio component.

29. The system of claim 27, wherein the at least one predetermined antenna characteristic comprises a predetermined antenna component number, the system further comprising means for disabling the radio component if the predetermined antenna component number is incorrect.

30. The system of claim 27, further comprising means for reading predetermined antenna characteristics over a network by a network administrator in a remote location.

31. An antenna system, comprising:
  means for receiving an identification stream from an antenna serialization component;
  means for processing the identification stream so as to identify at least one predetermined antenna characteristics;
  means for varying at least one operational parameters of a radio component in response to the at least one predetermined antenna characteristic;
  means for modifying a value of the at least one antenna characteristic of the identification stream stored at the antenna serialization component responsive to a remote signal; and
  means for reading predetermined antenna characteristics over a network by a network administrator at a remote location.

32. The system of claim 27, wherein the at least one predetermined antenna characteristic comprises a predetermined radio component operational frequency range.

33. The system of claim 31, wherein the at least one predetermined antenna characteristic comprises a predetermined antenna component number, the system further comprises means for disabling the radio component responsive to reading an invalid antenna component number.

* * * * *